(12) United States Patent
Eichler

(10) Patent No.: US 7,980,002 B2
(45) Date of Patent: Jul. 19, 2011

(54) ROTARY DRUM FOR THE AEROBIC HEATING OF POURABLE SOLIDS

(75) Inventor: Dietrich Eichler, Grosskarolinenfeld (DE)

(73) Assignee: Röhren-und Pumpenwerk Bauer Gesellschaft mbH, Voitsberg (AT)

( * ) Notice: Subject to any disclaimer, the term of this patent is extended or adjusted under 35 U.S.C. 154(b) by 0 days.

(21) Appl. No.: 12/695,971

(22) Filed: Jan. 28, 2010

(65) Prior Publication Data
US 2010/0186254 A1   Jul. 29, 2010

Related U.S. Application Data

(62) Division of application No. 11/667,720, filed as application No. PCT/DE2005/001995 on Nov. 8, 2005, now abandoned.

(30) Foreign Application Priority Data

Nov. 16, 2004  (DE) .............. 10 2004 051 802 U
May 20, 2005  (DE) .............. 10 2005 023 258 U

(51) Int. Cl.
*F26B 11/00*  (2006.01)
(52) U.S. Cl. .............. 34/359; 34/596; 34/136; 34/389; 34/520; 34/90; 432/110; 210/741; 99/337; 99/470; 134/65; 366/7; 118/19
(58) Field of Classification Search .......... 34/359, 34/586, 136, 389, 520, 387, 90; 432/110; 210/741; 99/334, 470; 95/270; 134/65; 366/7; 118/19
See application file for complete search history.

(56) References Cited

U.S. PATENT DOCUMENTS

| | | | | | |
|---|---|---|---|---|---|
| 1,370,513 | A | * | 3/1921 | Boswell | 34/136 |
| 1,378,407 | A | * | 5/1921 | Fraser | 34/128 |
| 1,472,450 | A | * | 10/1923 | Yetter | 101/416.1 |
| 1,531,780 | A | * | 3/1925 | Greaves | 432/107 |
| 1,617,815 | A | * | 2/1927 | Lissauer et al. | 165/88 |
| 1,641,108 | A | * | 8/1927 | West | 34/128 |
| 1,647,763 | A | * | 11/1927 | Aldeen | 134/65 |
| 1,649,839 | A | * | 11/1927 | Marston | 34/109 |
| 1,655,724 | A | * | 1/1928 | Carpenter | 34/134 |
| 1,694,708 | A | * | 12/1928 | Jones | 432/92 |
| 1,731,457 | A | * | 10/1929 | Fasting | 432/106 |

(Continued)

FOREIGN PATENT DOCUMENTS

DE           360442 C       10/1922

(Continued)

*Primary Examiner* — Steve Gravini
(74) *Attorney, Agent, or Firm* — Scott D. Wofsy; Edwards Angell Palmer & Dodge LLP

(57) ABSTRACT

The invention relates to a rotary drum in which the hygienic status of pourable solids separated from liquid cattle manure is modified by aerobic heating in such a manner that said solids can be reused as bedding in cattle sheds. The object of the invention is to obtain a high loading factor amounting to 60-70% filling of the drum which is located horizontally for installation in an insulated container. In accordance with the invention, the loaded solid is kept in a chamber and is only transferred to the drum when there is no solid surrounding the chamber. The crucial element is a flap of the chamber which only opens and closes in this area. If there is any solid resting on the outside of the flap then opening of the flap is prevented.

11 Claims, 4 Drawing Sheets

U.S. PATENT DOCUMENTS

| | | | | |
|---|---|---|---|---|
| 1,744,884 A * | 1/1930 | Greiner | | 264/13 |
| 1,796,264 A * | 3/1931 | Grondal et al. | | 202/99 |
| 1,819,102 A * | 8/1931 | Kuppers | | 34/109 |
| 1,836,261 A * | 12/1931 | Madsen | | 366/8 |
| 1,871,934 A * | 8/1932 | West et al. | | 34/393 |
| 1,872,284 A * | 8/1932 | Harrigan | | 425/175 |
| 1,876,025 A * | 9/1932 | Sallee | | 432/107 |
| 1,925,761 A * | 9/1933 | Johnson | | 209/3 |
| 1,955,914 A * | 4/1934 | Holzapfel | | 432/117 |
| 1,982,250 A * | 11/1934 | Hallenbeck | | 432/109 |
| 1,987,242 A * | 1/1935 | Martin | | 209/3 |
| 1,994,343 A * | 3/1935 | Graves | | 99/471 |
| 2,027,475 A * | 1/1936 | Giraud | | 210/185 |
| 2,042,979 A * | 6/1936 | Orlin et al. | | 165/91 |
| 2,049,071 A * | 7/1936 | McCormick | | 34/397 |
| 2,057,526 A * | 10/1936 | Horton | | 34/130 |
| 2,069,174 A * | 1/1937 | Nielsen | | 34/109 |
| 2,076,873 A * | 4/1937 | Arnold | | 34/128 |
| 2,085,842 A * | 7/1937 | Wentworth | | 34/362 |
| 2,126,029 A * | 8/1938 | Parker | | 34/109 |
| 2,132,972 A * | 10/1938 | Schmidt | | 34/128 |
| 2,153,385 A | 4/1939 | Minogue | | |
| 2,165,487 A * | 7/1939 | Johnson | | 68/18 C |
| 2,179,485 A * | 11/1939 | Avril | | 366/181.2 |
| 2,237,798 A * | 4/1941 | Thomas | | 99/468 |
| 2,244,035 A * | 6/1941 | Whitmore et al. | | 134/18 |
| 2,264,646 A * | 12/1941 | Spears | | 34/135 |
| 2,279,362 A * | 4/1942 | Baker | | 34/109 |
| 2,290,765 A * | 7/1942 | Overman | | 34/128 |
| 2,299,043 A * | 10/1942 | Max | | 75/403 |
| 2,309,810 A * | 2/1943 | West | | 34/393 |
| 2,316,459 A * | 4/1943 | Schmidt L et al. | | 34/92 |
| 2,319,674 A * | 5/1943 | French et al. | | 34/586 |
| 2,339,207 A * | 1/1944 | Tyler | | 34/79 |
| 2,351,870 A * | 6/1944 | Newhouse | | 241/54 |
| 2,353,627 A * | 7/1944 | Miller | | 237/9 R |
| 2,354,567 A | 7/1944 | Adt | | |
| 2,386,203 A * | 10/1945 | Crosby | | 118/33 |
| 2,388,298 A * | 11/1945 | Stephens | | 426/461 |
| 2,400,935 A * | 5/1946 | Kent | | 202/131 |
| 2,418,239 A * | 4/1947 | Smith | | 34/77 |
| 2,452,858 A * | 11/1948 | Miller | | 264/605 |
| 2,460,008 A * | 1/1949 | Oswald | | 241/57 |
| 2,499,157 A * | 2/1950 | Peirce | | 34/137 |
| 2,514,050 A * | 7/1950 | Grebe | | 68/20 |
| 2,529,263 A * | 11/1950 | Reese | | 406/81 |
| 2,533,888 A * | 12/1950 | Kahn | | 68/12.09 |
| 2,572,678 A * | 10/1951 | Torres | | 34/547 |
| 2,592,783 A * | 4/1952 | Aspegren | | 165/111 |
| 2,603,005 A * | 7/1952 | Ford | | 34/141 |
| 2,624,124 A * | 1/1953 | Irving | | 34/135 |
| 2,673,101 A * | 3/1954 | Maslin | | 277/380 |
| 2,676,418 A * | 4/1954 | Shewmon | | 34/77 |
| 2,686,372 A * | 8/1954 | Graham | | 34/75 |
| 2,696,677 A * | 12/1954 | Molenaar | | 34/594 |
| 2,744,338 A * | 5/1956 | Walter | | 34/58 |
| 2,783,548 A * | 3/1957 | Gisli | | 34/79 |
| 2,792,640 A * | 5/1957 | Patterson | | 34/75 |
| 2,792,641 A * | 5/1957 | Heathcote | | 34/85 |
| 2,798,693 A * | 7/1957 | Gustav | | 165/88 |
| 2,805,493 A * | 9/1957 | Bestehorn | | 34/130 |
| 2,837,813 A | 6/1958 | Gates | | |
| 2,837,831 A * | 6/1958 | Gates | | 34/92 |
| 2,850,809 A * | 9/1958 | Lamb | | 34/128 |
| 2,851,792 A * | 9/1958 | Steimel et al. | | 34/128 |
| 2,857,684 A * | 10/1958 | Gisli | | 34/66 |
| 2,873,537 A * | 2/1959 | Gray, Jr. et al. | | 34/75 |
| 2,884,707 A * | 5/1959 | Jonas | | 34/491 |
| 2,957,330 A | 10/1960 | Cline | | |
| 2,967,696 A * | 1/1961 | Mauldin et al. | | 366/25 |
| 3,020,646 A * | 2/1962 | Werner et al. | | 34/372 |
| 3,022,047 A * | 2/1962 | Swaney | | 165/89 |
| 3,076,270 A * | 2/1963 | Madsen | | 34/128 |
| 3,139,633 A * | 7/1964 | Fecho et al. | | 8/158 |
| 3,152,876 A * | 10/1964 | Nikolaus | | 34/619 |
| 3,214,846 A * | 11/1965 | Soloff | | 34/142 |
| 3,224,922 A * | 12/1965 | Fry, Jr. | | 156/433 |
| 3,228,838 A * | 1/1966 | Rinfret et al. | | 34/284 |
| 3,229,380 A * | 1/1966 | Worst | | 34/533 |
| 3,245,759 A * | 4/1966 | Eweson | | 422/210 |
| 3,262,686 A * | 7/1966 | Kraus et al. | | 432/151 |
| 3,267,701 A * | 8/1966 | Mandarino | | 68/12.15 |
| 3,270,529 A * | 9/1966 | Engel | | 68/18 |
| 3,280,993 A | 10/1966 | Wolfe | | |
| 3,327,401 A * | 6/1967 | Chris et al. | | 34/279 |
| 3,331,142 A * | 7/1967 | Rossi | | 34/135 |
| 3,369,305 A * | 2/1968 | Becker | | 34/451 |
| 3,389,707 A * | 6/1968 | Waldemar | | 131/303 |
| 3,396,476 A * | 8/1968 | Eaves | | 34/484 |
| 3,416,334 A * | 12/1968 | Candor et al. | | 68/20 |
| 3,504,444 A * | 4/1970 | Laue et al. | | 34/131 |
| 3,525,161 A * | 8/1970 | Jesperson | | 34/322 |
| 3,608,202 A * | 9/1971 | Arndt et al. | | 33/794 |
| 3,612,076 A * | 10/1971 | Brahm | | 134/102.1 |
| 3,789,796 A * | 2/1974 | Madrid | | 118/612 |
| 3,813,793 A * | 6/1974 | van der Lely et al. | | 34/580 |
| 3,946,996 A * | 3/1976 | Gergely | | 366/139 |
| 4,020,564 A * | 5/1977 | Bayliss | | 34/585 |
| 4,087,921 A * | 5/1978 | Blok | | 34/261 |
| 4,112,590 A * | 9/1978 | Muller | | 34/75 |
| 4,130,944 A * | 12/1978 | Hultsch et al. | | 34/323 |
| 4,154,003 A * | 5/1979 | Muller | | 34/469 |
| 4,189,300 A * | 2/1980 | Butler | | 432/118 |
| 4,205,458 A * | 6/1980 | Austin | | 34/134 |
| 4,214,376 A * | 7/1980 | Lucke et al. | | 34/368 |
| 4,254,557 A * | 3/1981 | Mayer et al. | | 34/249 |
| 4,254,558 A * | 3/1981 | Mayer | | 34/249 |
| 4,254,616 A * | 3/1981 | Siminski et al. | | 60/39.12 |
| 4,255,166 A * | 3/1981 | Gernand et al. | | 95/27 |
| 4,255,403 A * | 3/1981 | Mayer et al. | | 423/244.06 |
| 4,260,373 A * | 4/1981 | Fellnor et al. | | 432/110 |
| 4,354,317 A * | 10/1982 | Mathis et al. | | 34/499 |
| 4,444,810 A * | 4/1984 | Huttlin | | 427/212 |
| 4,461,093 A * | 7/1984 | Hultsch et al. | | 34/323 |
| 4,492,043 A * | 1/1985 | Zannoni | | 34/520 |
| 4,494,314 A * | 1/1985 | Gell, Jr. | | 34/368 |
| 4,515,629 A * | 5/1985 | Dizek et al. | | 75/343 |
| 4,517,992 A * | 5/1985 | Korte et al. | | 131/304 |
| 4,628,614 A * | 12/1986 | Thompson | | 34/387 |
| 4,633,595 A * | 1/1987 | van den Broek | | 34/108 |
| 4,649,655 A * | 3/1987 | Witten | | 34/135 |
| 4,674,198 A * | 6/1987 | Huttlin | | 34/135 |
| 4,688,336 A * | 8/1987 | Egger et al. | | 34/109 |
| 4,730,400 A * | 3/1988 | Johannsen | | 34/380 |
| 4,742,622 A * | 5/1988 | Thompson | | 34/387 |
| 4,745,691 A * | 5/1988 | Bradbury | | 34/377 |
| 4,860,461 A * | 8/1989 | Tamaki et al. | | 34/68 |
| 4,860,462 A * | 8/1989 | Gobel | | 34/108 |
| 4,933,073 A * | 6/1990 | Jonkers et al. | | 209/284 |
| 4,945,657 A * | 8/1990 | Shinn et al. | | 34/128 |
| 4,964,226 A * | 10/1990 | Gobel | | 34/136 |
| 5,020,237 A * | 6/1991 | Gross et al. | | 34/265 |
| 5,052,809 A * | 10/1991 | Young | | 366/25 |
| 5,135,122 A * | 8/1992 | Gross et al. | | 219/685 |
| 5,137,545 A * | 8/1992 | Walker | | 95/270 |
| 5,165,432 A * | 11/1992 | McKibben | | 134/65 |
| 5,172,487 A * | 12/1992 | Hansen et al. | | 34/291 |
| 5,285,581 A * | 2/1994 | Walker | | 34/500 |
| 5,318,049 A * | 6/1994 | Henderson et al. | | 131/290 |
| 5,359,788 A * | 11/1994 | Gell, Jr. | | 34/360 |
| 5,393,501 A * | 2/1995 | Clawson et al. | | 422/187 |
| 5,455,005 A * | 10/1995 | Clawson et al. | | 422/1 |
| 5,460,085 A * | 10/1995 | Cappellari et al. | | 100/37 |
| 5,470,146 A * | 11/1995 | Hawkins | | 366/25 |
| 5,500,237 A * | 3/1996 | Gell et al. | | 426/466 |
| 5,525,239 A * | 6/1996 | Duske | | 210/739 |
| 5,531,826 A * | 7/1996 | Fusejima et al. | | 118/19 |
| 5,540,846 A * | 7/1996 | Koch et al. | | 210/741 |
| 5,548,904 A * | 8/1996 | Rood | | 34/82 |
| 5,609,097 A * | 3/1997 | Newnan | | 99/470 |
| 5,615,493 A * | 4/1997 | Funder | | 34/583 |
| 5,746,006 A * | 5/1998 | Duske et al. | | 34/136 |
| 5,852,882 A * | 12/1998 | Kendall et al. | | 34/599 |
| 5,943,790 A * | 8/1999 | Gell, Jr. | | 34/606 |
| 6,052,917 A * | 4/2000 | Matsumoto | | 34/138 |
| 6,065,226 A * | 5/2000 | Gell, Jr. | | 34/594 |
| 6,125,550 A * | 10/2000 | Kendall et al. | | 34/316 |

| | | | |
|---|---|---|---|
| 6,418,834 B1 * | 7/2002 | Perrine | 99/334 |
| 6,584,700 B1 * | 7/2003 | Hawkins | 34/137 |
| 6,618,956 B1 * | 9/2003 | Schilp et al. | 34/58 |
| 6,672,751 B2 * | 1/2004 | Hawkins | 366/25 |
| 6,742,473 B1 * | 6/2004 | Giogoli et al. | 118/19 |
| 6,754,978 B1 | 6/2004 | Adams et al. | |
| 7,044,630 B1 * | 5/2006 | Hawkins | 366/7 |
| 7,251,905 B2 * | 8/2007 | Doh et al. | |
| 7,340,849 B2 * | 3/2008 | Kim | 34/602 |
| 2002/0131321 A1 * | 9/2002 | Hawkins | 366/7 |
| 2003/0221330 A1 * | 12/2003 | Arnold | 34/58 |
| 2004/0123487 A1 | 7/2004 | Han | |
| 2004/0123488 A1 | 7/2004 | Han | |
| 2004/0134093 A1 | 7/2004 | Han | |
| 2004/0219466 A1 * | 11/2004 | Marino et al. | 431/9 |
| 2005/0132593 A1 | 6/2005 | Doh et al. | |
| 2006/0005418 A1 | 1/2006 | Kim | |
| 2007/0033828 A1 * | 2/2007 | Hartkop et al. | |
| 2007/0294910 A1 * | 12/2007 | Eichler | |
| 2008/0189976 A1 * | 8/2008 | Krell et al. | 34/359 |
| 2008/0189980 A1 * | 8/2008 | Krell et al. | 34/586 |

FOREIGN PATENT DOCUMENTS

| | | |
|---|---|---|
| DE | 445313 C | 6/1927 |
| DE | 861237 C | 12/1952 |
| DE | 915916 C | 7/1954 |
| DE | 967068 C | 9/1957 |
| DE | 1289494 B | 2/1969 |
| DE | 102004031015 A1 | 1/2006 |
| EP | 1378407 A1 * | 1/2004 |
| EP | 1617815 A2 * | 1/2006 |
| EP | 1647763 A1 * | 4/2006 |
| EP | 1655724 A2 * | 5/2006 |
| EP | 1694708 A2 * | 8/2006 |
| EP | 1731457 A1 * | 12/2006 |
| EP | 1796264 A1 * | 6/2007 |
| EP | 1819102 A1 * | 8/2007 |
| EP | 1871934 A1 * | 1/2008 |
| EP | 1876025 A1 * | 1/2008 |
| EP | 1955914 A2 * | 8/2008 |
| EP | 2042979 A2 * | 4/2009 |
| EP | 2085842 A1 * | 8/2009 |
| EP | 2132972 A1 * | 12/2009 |
| EP | 2244035 A1 * | 10/2010 |
| FR | 527295 A | 10/1921 |
| FR | 2850809 A1 * | 8/2004 |
| FR | 2851792 A1 * | 9/2004 |
| FR | 2857684 A1 * | 1/2005 |
| GB | 2400935 A * | 10/2004 |
| GB | 2418239 A * | 3/2006 |
| GB | 2452858 A * | 3/2009 |
| WO | WO9740944 A1 | 11/1997 |
| WO | WO-2006111110 A1 | 10/2006 |

* cited by examiner

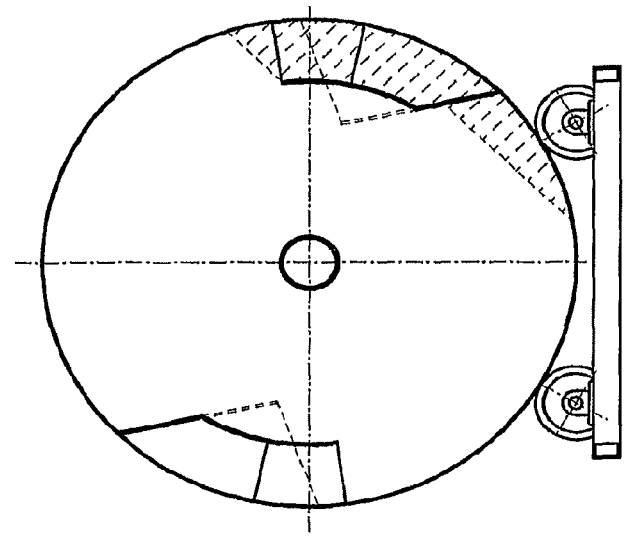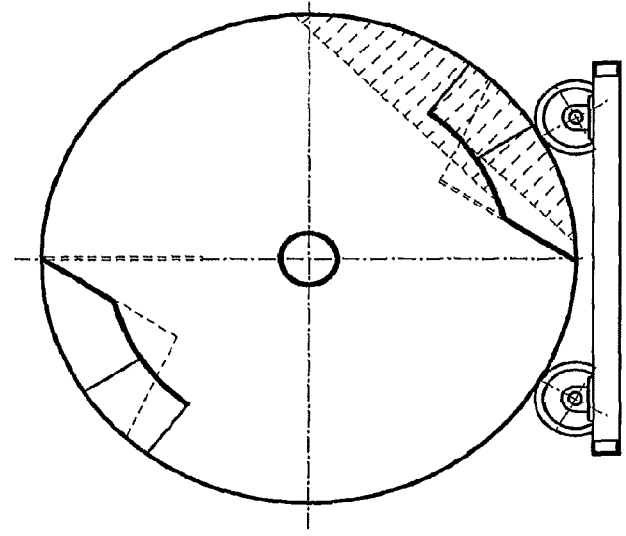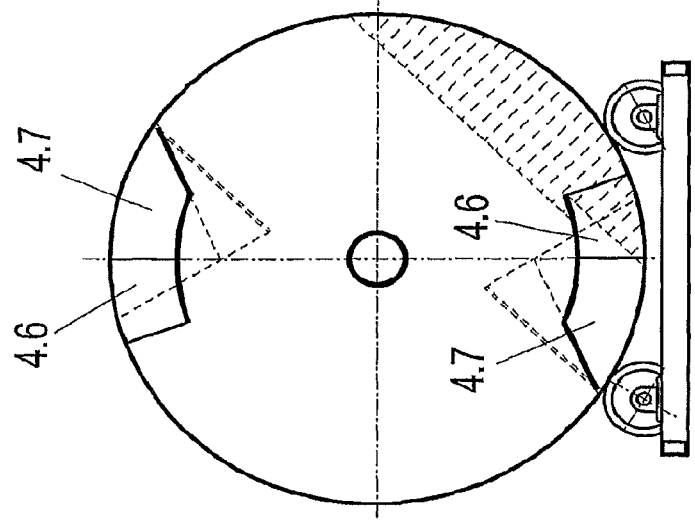

Section B-B

ROTARY DRUM FOR THE AEROBIC HEATING OF POURABLE SOLIDS

CROSS-REFERENCE TO RELATED APPLICATIONS

This application is a divisional application of U.S. patent application Ser. No. 11/667,720, filed May 14, 2007, Now Abandoned which is a U.S. national phase application of international patent application number PCT/DE2005/001995, filed Nov. 8, 2005, and claims the benefit of priority to German patent application number 10 2005 023 258.2, filed May 20, 2005, and German patent application number 10 2004 051 802.5, filed Nov. 16, 2004. Each of the foregoing applications is incorporated herein by reference, in its entirety.

FIELD OF APPLICATION

The subject matter of the invention is a rotary drum in which germs can be reduced and water removed by means of an aerobic heating process. The field of application is mainly in the treatment of pourable solids separated from liquid cattle manure. Hereby, the object is to modify the hygienic status of the solid in such a way that it can be reused as bedding in cattle sheds.

TYPICAL CHARACTERISTICS OF KNOWN TECHNICAL SOLUTIONS

Rotary drums for the treatment of materials in different ways have been known for a long time. The pourable solids are introduced through funnels as is disclosed in specifications DE 26 34 220 C2 and U.S. Pat. No. 4,168,915. Consequently, without special adapters in the loading area thereof, it is only possible to fill a horizontal drum to a capacity of approximately 35% taken with respect to the diameter of the drum.

In order to get quantities above this into the drum, it is necessary to have blades, baffle plates and guide plates or screw conveyers of various designs installed in the drum. A plurality of similar built-in features are provided for this purpose in patent specification DE 270 86 98.

In order to enable the drum to be ventilated by means of a suction draught from the supply to the discharge side, a spiral channel using the solid being discharged as a closure member is arranged at the discharge side in DE PA 199 28 883,6. This solution requires precise dosage of the quantities being fed-in and discharged. The drum would otherwise be either over-filled or emptied. In this publication, the drum is accommodated in a container. This arrangement has the advantage that the heat from the biological process and the heated air from a drive motor can be distributed uniformly over the outer casing of the drum.

THE OBJECT OF THE INVENTION

An object of the invention is to obtain a filling degree of 60-70% for a horizontal drum that is be installed in a container utilising a simple device. Furthermore, just as much solid as is being supplied to the filling side should always be automatically leaving the drum.

The supply of air necessary for the micro-biological process should be designed in such a way that, by using the counter-flow principle, the treated material comes into contact with cold fresh air whereas the material in the vicinity of the supply side comes into contact with used warm air.

FEATURES OF THE INVENTION

According to the invention, the pourable solid that is to be fed-in is kept in a chamber and is only delivered in that area thereof in which no solid is present. The crucial element is a flap provided in the chamber which opens only within the area and closes. If any solid is resting on the outside thereof, the flap cannot open.

For the purposes of carrying out this operation, the pourable solid at the inlet side of the rotary drum passes through a funnel and a central opening into an antechamber bounded by an outer side wall of the drum and an inner side wall located behind and spaced from the outer side wall. An inlet channel provided on the wall of the drum and located between these walls picks up the solid in the direction of rotation. An opening in the inner side wall leads to a release chamber located in the interior of the drum.

The release chamber is covered by a flap which opens into the interior of the drum but which does not open until, due to the rotation of the drum, the release chamber is in an area where there is no solid present. In the course of further rotation, the flap closes again before it re-enters the solid.

Depending on the quantity of solid that is to be introduced, several such devices for inserting the pourable solid can be located around the periphery of the drum.

In order to enable ventilation to be effected despite the filling process taking place along the axis, supply air is sucked in through the ring-shaped weir required for the discharge of the solid in a direction opposed to that in which the solid is being advanced and is then sucked out through a fixed pipeline at the inlet end.

Supply air is sucked in through a ring-shaped weir required for the discharge of the solid in a direction opposed to that in which the solid is being advanced. Sucking off the air is effected through a fixed axially located pipeline which is extended radially into the solid-free portion of the drum in the vicinity of the filling side for the solid. A downwardly arranged elbow portion is attached here for preventing solids from falling into the pipe. The suction pipe is fixed to the funnel. A fan produces a negative pressure required for the movement of the air.

BRIEF DESCRIPTION OF THE DRAWINGS

One exemplary embodiment of the invention will be explained in more detail below with reference to the figures, in which:

FIGS. 3, 4 and 5 show cross-section A-A of the rotary drum of FIG. 1, showing the drum rotated at different angles in accordance with an embodiment of the invention.

EXEMPLARY EMBODIMENT

Figure 1:
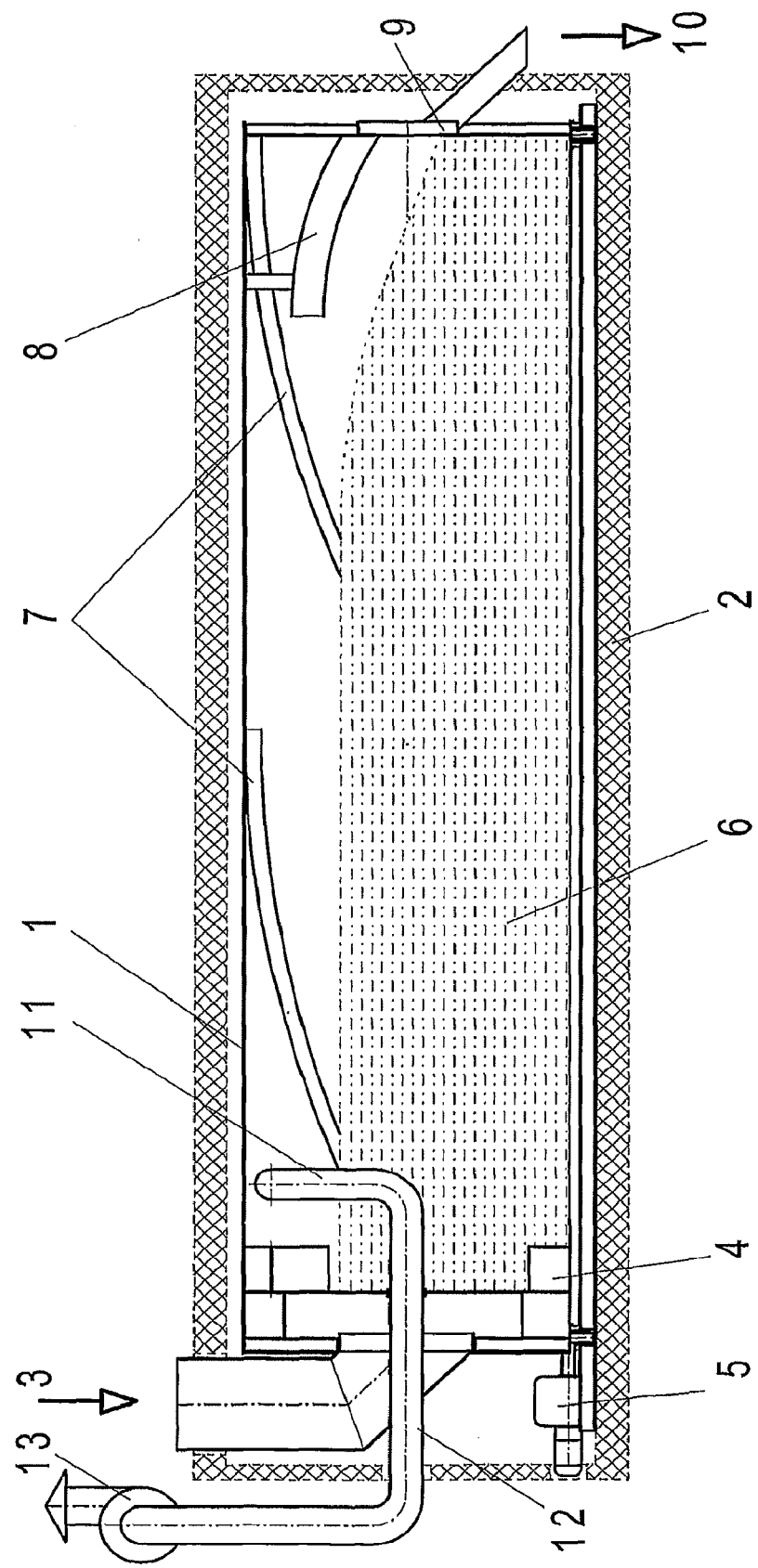
FIG. 1 shows a longitudinal section through a rotary drum installed in an insulated container constructed in accordance with an embodiment of the invention.

FIG. 1 shows a longitudinal section through a rotary drum (1) which is installed in an insulated container (2). Goods to be treated (3) are introduced into the interior of the rotary drum (1) through a filling device (4). The rotary drum (1) is set into rotation by a drive (5). The pourable solid (6) is constantly moved toward the discharge side by blades (7) attached to the surface of the drum. Guide plates (8) effective in opposite direction are located in the vicinity of the discharge side and are fixed at a distance of approximately half a radius from the surface of the drum. They dam up the solid in front of the ring-shaped discharge weir (9). In consequence, a large portion of the drum volume remains filled with 65-75% solid. Only that much solid as is supplied by way of the filling device (4) is discharged from the drum through the discharge weir (9).

The air flowing through the discharge weir (9) in a direction counter to that of the flow of the solid, over the filling volume (6), is sucked out of the system by means of a fan (13) through a fixed ventilation pipe (11) and the following axial pipe (12). If necessary, a filter system corresponding to the state of the art can be connected here at the outlet side thereof.

Figure 2:
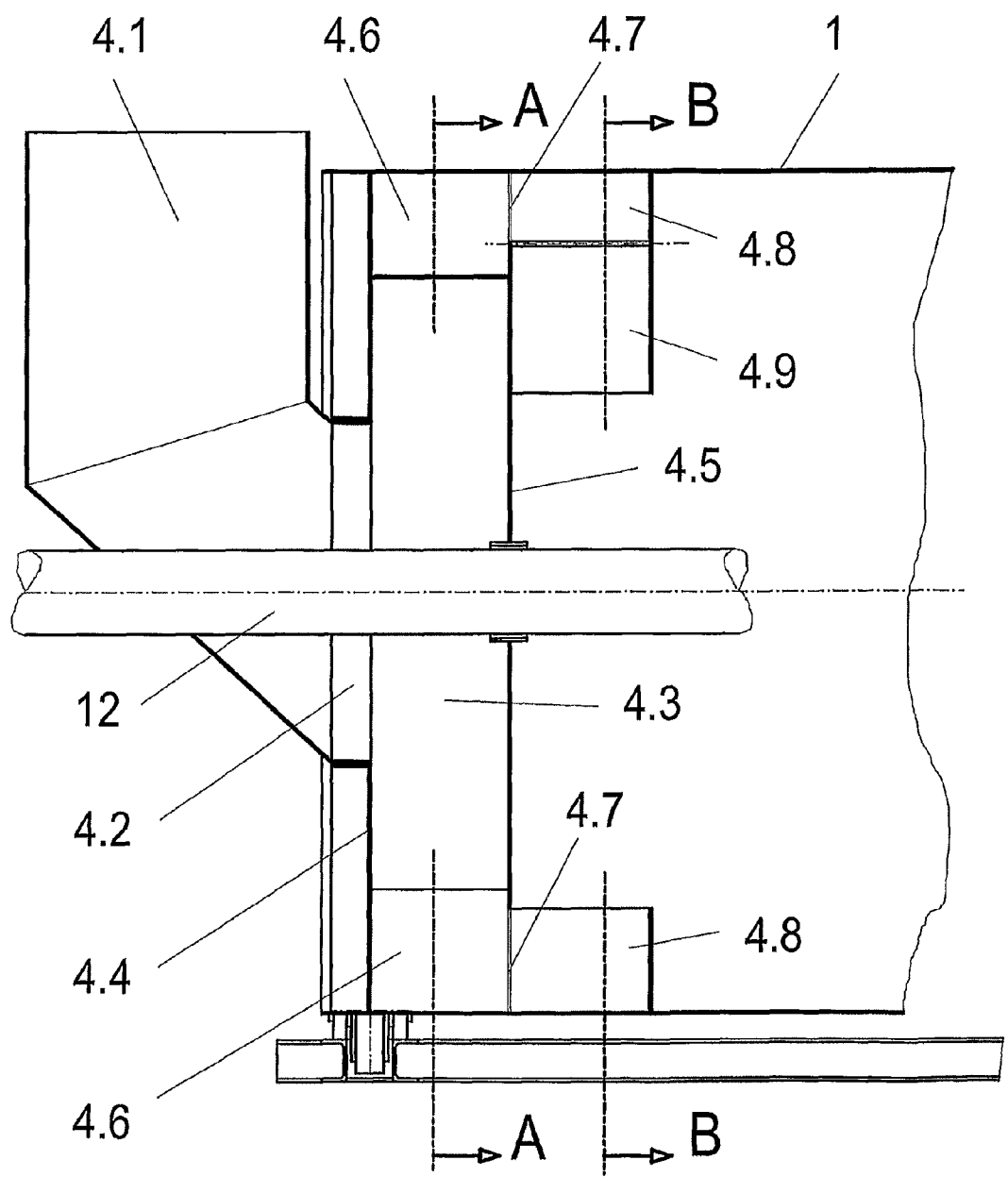
FIG. 2 shows an axial section of a rotary drum of FIG. 1, showing a filling device in accordance with an embodiment of the invention.

FIG. 2 is an axial section of the drum (1) showing the filling device (4) at the intake side and the positions of the sections A-A and B-B shown in the following figures. The damp solid that is to be composted passes through the funnel (4.1) and the central opening (4.2) and enters the antechamber (4.3) which is formed by the face wall (4.4) and the inner side wall (4.5).

In this embodiment, two oppositely located identical filler systems are provided for feeding purposes.

During rotation of the drum, the pourable solid is picked up by the inlet channel (4.6) that is open in the direction of rotation, and is carried into the rear portion of this channel during further rotation of the drum. Here, there is an opening (4.7) in the inner side wall (4.5) through which the solid enters the release chamber (4.8) in the course of further rotation.

At the appropriate side thereof, this chamber has a flap (4.9) which will only open when the chamber reaches that portion of the drum in which no solid is present so that the flap can only open here. A further condition for the position of the flap (4.9) is that it closes before it re-enters the solid and remains closed whilst in the solid.

For the purposes of a better overview, the reference symbols are only provided at a few location of the following figures.

FIGS. 3, 4 and 5 show the section A-A through the antechamber (4) illustrated in FIG. 1. The drum is rotated through approximately 33° in FIG. 4 and through a further 45° in FIG. 5. In FIG. 3, the solid begins to flow into the inlet channel (4.6) in the lower filler device. In the upper filler device, the process of emptying the channel through the opening (4.7) is already completed. In FIG. 4, the process of filling the inlet channel (4.6) is almost completed and the solid is already entering the release chamber (4.8) represented by dashed lines through the opening (4.7) in the inner side wall (4.5). In FIG. 5, just so much solid as the release chamber (4.8) can accommodate now slides through the opening (4.7) from the inlet channel (4.6).

Figure 6:
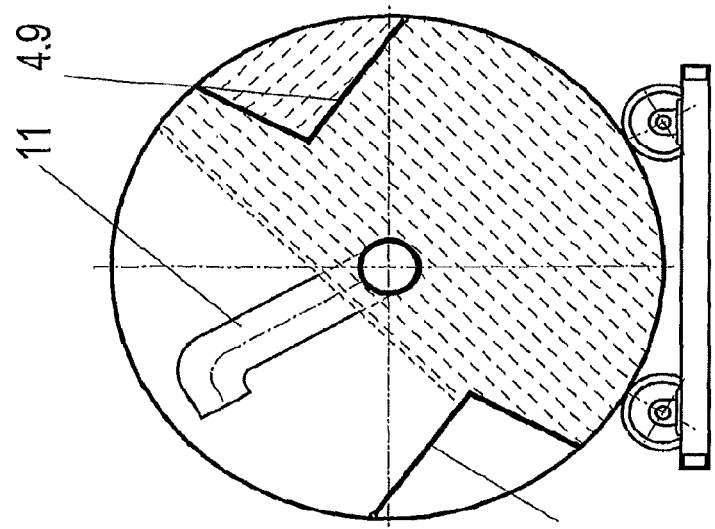
FIGS. 6, 7 and 8 show cross-section B-B of the rotary drum of FIG. 2, showing the drum rotated at different angles in accordance with an embodiment of the invention.
Figure 7:
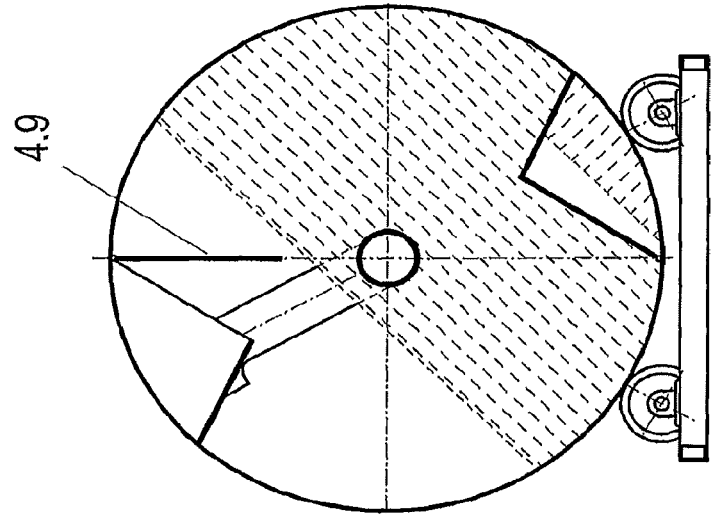
Figure 8:
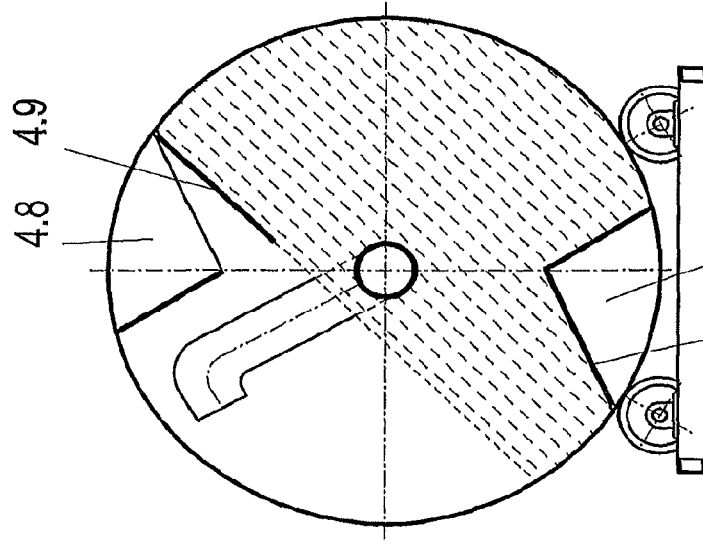

FIGS. 6, 7 and 8 show the section B-B represented in FIG. 2. Hereby, the drum is likewise rotated through approximately 33° in FIG. 7 and through a further 45° in FIG. 8. In FIG. 6, the flap (4.9) of the release chamber (4.8) of the now upwardly located filler device has just opened and the solid has slid down into the drum. The flap of the filler device in the lower position is held in a closed position by the solid abutting the flap.

In FIG. 7, the flap (4.9) of the filler device now located in the upper position has reached its largest opening angle and then begins to close again under its own dead weight. In FIG. 8, the outpouring solid begins to cover the already closed flap (4.9). In the oppositely located filler device, the associated flap would open under its own dead weight if there were no solid in the drum. However, it cannot open up because the still immoveable solid is preventing this action. In consequence, its contents are carried into the area in which the flap can reopen due to the flow-off of the solid thereby enabling 60-70% filling of the drum.

In this figure furthermore, the fixed ventilation pipe (11) is shown together with its elbow portion which leads away from the solid-free part of the drum.

What is claimed is:

1. A device for preparing bedding from pourable solid material separated from liquid cattle manure, comprising:
   a horizontally oriented rotary drum having an inlet side at one axial end and an outlet side at an axial end opposite the inlet side;
   means for rotating said rotary drum about a longitudinal rotary axis;
   inlet means at said inlet side of the rotary drum for supplying untreated pourable solid material into said rotary drum;
   outlet means at said outlet side for discharging treated pourable solid material usable as bedding from said rotary drum; and
   ventilation means for introducing fresh air into the interior of the rotary drum through said outlet means and means for suctioning off used air from the interior of the rotary drum in the vicinity of said inlet means,
   wherein said inlet means comprises at least a single release chamber disposed within the rotary drum at the inlet side thereof for receiving an amount of untreated pourable solid material, said release chamber being located radially offset from said longitudinal rotary axis; and
   wherein said release chamber has a discharge opening for discharging the untreated material in the release chamber into the interior of the rotary drum, and closing means adapted and configured for opening said discharge opening only when the release chamber, during rotation of the rotary drum, is in a momentary circumferential position in which it is not exposed to the pourable solid material present in the rotary drum and for closing said discharge opening in a momentary circumferential position of the release chamber prior to becoming exposed again to the pourable solid material present in the rotary drum.

2. The device according to claim 1, wherein said inlet means further comprises an antechamber, said antechamber rotating in common with said rotary drum and being bound by outer and inner side walls spaced from each other, a funnel for supplying untreated pourable solid material into the antechamber, and an inlet channel provided between said side walls of the antechamber for picking up an amount of the untreated pourable solid material contained in the antechamber during rotation thereof, said inlet channel having an opening communicating with said release chamber for transferring during rotation of the antechamber the untreated pourable solid material contained in the inlet channel into said release chamber.

3. The device according to claim 1, wherein said inlet means comprises a plurality of release chambers circumferentially spaced from each other, each of said release chambers having a discharge opening for discharging the untreated material contained therein, and closing means adapted and configured for opening said discharge opening only when said release chamber, during rotation of the rotary drum, is in a momentary circumferential position in which it is not exposed to the pourable solid material contained in the rotary drum, and for closing said discharge opening in a momentary circumferential position of the release chamber prior to becoming exposed again to said pourable solid material contained in the rotary drum.

4. The device according to claim 1, wherein said rotary drum further comprises blades attached to an inner circumferential surface of the rotary drum for advancing the pourable solid material present in the rotary drum towards the outlet means thereof, and guide plates effective in an opposite direction being arranged in the vicinity of the outlet side of the rotary drum and fixed at a distance of about half a radius from said circumferential surface of the drum.

5. The device according to claim 1, wherein said closing means for closing and opening said discharge opening comprises a flap adapted and configured for covering the discharge opening and to be movable by gravity between open and closed positions thereof.

6. The device according to claim 1, wherein said ventilation means comprises a suction pipe extending in the vicinity of said inlet means into the interior of the rotary drum and open to an upper portion thereof, which portion is free of pourable solid material.

7. A method of preparing bedding from pourable solid material separated from liquid cattle manure in a horizontally oriented rotary drum, said rotary drum having a rotary axis, and further having at least a single inlet means adjacent one axial end thereof for introducing untreated solid material into said rotary drum, and outlet means for withdrawing treated solid material usable as bedding from said rotary drum adjacent the other axial end thereof, said method comprising the steps of:

maintaining a filling degree inside the rotary drum such that a zone free of solid material exists above a filling level of the solid material within the rotary drum by controlling the amount of solid material introduced into and withdrawn from said rotary drum;

opening said inlet means for introducing said untreated solid material into said zone free of solid material during a first period of a full rotation of the rotary drum when said inlet means is exposed to said zone while closing said inlet means during a subsequent period when said inlet means is exposed to the solid material within the rotary drum;

conveying the solid material within the rotary drum in a direction towards the outlet means by rotating the rotary drum; and continuously introducing fresh air into said zone free of solid material and extracting used air therefrom.

8. The method according to claim 7, in which said fresh air is introduced into said rotary drum adjacent an end side thereof facing the outlet means while the used air is extracted from an end side of the rotary drum adjacent the inlet means thereof.

9. The method according to claim 7, in which said filling degree is maintained in a range between about 60% and 70% of a total filling of the rotary drum.

10. The method according to claim 7, further comprising the step of supplying said untreated solid material into an antechamber of said rotary drum prior to introducing it into said zone free of solid material, said antechamber rotating in common with said rotary drum and having a supply inlet for said untreated solid material and an outlet communicating with said inlet means of said rotary drum.

11. The method according to claim 7, the step of introducing said untreated solid material into said rotary drum comprises the step of introducing said untreated solid material at a plurality of portions circumferentially spaced about said rotary axis, each of said portions having an inlet means which is opened when it is exposed to said zone free of solid material, and closed when it is exposed to said solid material.

* * * * *